US011516107B2

(12) United States Patent
Subramanian et al.

(10) Patent No.: US 11,516,107 B2
(45) Date of Patent: Nov. 29, 2022

(54) AGGREGATION-BASED SPEED TESTING

(71) Applicant: VIAVI SOLUTIONS INC., San Jose, CA (US)

(72) Inventors: Karthik Subramanian, Germantown, MD (US); Reynald Dupuis, Germantown, MD (US); Hans Joerg Wolf, Woodbine, MD (US)

(73) Assignee: VIAVI SOLUTIONS INC., San Jose, CA (US)

( * ) Notice: Subject to any disclaimer, the term of this patent is extended or adjusted under 35 U.S.C. 154(b) by 112 days.

(21) Appl. No.: 16/983,761

(22) Filed: Aug. 3, 2020

(65) Prior Publication Data

US 2022/0038363 A1 Feb. 3, 2022

(51) Int. Cl.
*H04L 43/50* (2022.01)
*H04L 43/0894* (2022.01)
*H04L 43/16* (2022.01)
*G06F 11/34* (2006.01)
*H04L 43/0888* (2022.01)

(52) U.S. Cl.
CPC .......... *H04L 43/50* (2013.01); *G06F 11/3409* (2013.01); *H04L 43/0888* (2013.01); *H04L 43/0894* (2013.01); *H04L 43/16* (2013.01); *G06F 2201/875* (2013.01)

(58) Field of Classification Search
CPC .......... H04L 43/16; H04L 43/50; G06F 11/34
USPC ....................................................... 709/224
See application file for complete search history.

(56) References Cited

U.S. PATENT DOCUMENTS

2012/0005332 A1\* 1/2012 Beattie, Jr. .......... H04L 43/0882
709/224

\* cited by examiner

*Primary Examiner* — Sibte H Bukhari
(74) *Attorney, Agent, or Firm* — Mannava & Kang, P.C.

(57) ABSTRACT

In some examples, aggregation-based speed testing may include ascertaining, by a test speed analyzer, a test speed that corresponds to a maximum specified data transfer rate for a data transmission link. A test range generator may determine a maximum specified port speed of a test port of a device connected to the data transmission link. The test range generator may determine whether the maximum specified port speed is less than the test speed, and if so, divide the test speed into a plurality of test ranges. A total value of the test ranges may be equal to the test speed. A test performer may perform tests corresponding to the test ranges, and obtain intermediate test results. A test result generator may generate, based on aggregation of the intermediate test results, an aggregated test result that represents an actual speed associated with the data transmission link.

15 Claims, 13 Drawing Sheets

900

ASCERTAIN, BY AT LEAST ONE HARDWARE PROCESSOR, A TEST SPEED THAT CORRESPONDS TO A MAXIMUM SPECIFIED DATA TRANSFER RATE FOR A DATA TRANSMISSION LINK THAT IS TO BE TESTED
902

↓

DETERMINE, BY THE AT LEAST ONE HARDWARE PROCESSOR, A MAXIMUM SPECIFIED PROCESSING SPEED OF AT LEAST ONE TEST PROCESSOR OF A TEST INSTRUMENT
904

↓

DETERMINE, BY THE AT LEAST ONE HARDWARE PROCESSOR, WHETHER THE MAXIMUM SPECIFIED PROCESSING SPEED OF THE AT LEAST ONE TEST PROCESSOR OF THE TEST INSTRUMENT IS LESS THAN THE TEST SPEED
906

↓

BASED ON A DETERMINATION THAT THE MAXIMUM SPECIFIED PROCESSING SPEED OF THE AT LEAST ONE TEST PROCESSOR OF THE TEST INSTRUMENT IS LESS THAN THE TEST SPEED, DIVIDE, BY THE AT LEAST ONE HARDWARE PROCESSOR, THE TEST SPEED INTO A PLURALITY OF TEST RANGES CORRESPONDING TO THE AT LEAST ONE TEST PROCESSOR
908

↓

PERFORM, BY THE AT LEAST ONE HARDWARE PROCESSOR, FOR THE AT LEAST ONE TEST PROCESSOR, A TEST CORRESPONDING TO EACH TEST RANGE OF THE PLURALITY OF TEST RANGES
910

OBTAIN, BY THE AT LEAST ONE HARDWARE PROCESSOR, AN INTERMEDIATE TEST RESULT FOR EACH TEST RANGE OF THE PLURALITY OF TEST RANGES
912

GENERATING, BY THE AT LEAST ONE HARDWARE PROCESSOR, BASED ON AGGREGATION OF EACH INTERMEDIATE TEST RESULT FOR EACH TEST RANGE OF THE PLURALITY OF TEST RANGES, AN AGGREGATED TEST RESULT THAT REPRESENTS AN ACTUAL SPEED ASSOCIATED WITH THE DATA TRANSMISSION LINK
914

*FIG. 9 (CONT.)*

AGGREGATION-BASED SPEED TESTING

BACKGROUND

A test instrument may be utilized to perform a speed test by determining upload and download data transfer rates. For example, the test instrument may be utilized to perform an Internet speed test. In this regard, the test instrument may be connected, for example, to a data transmission link or to an intermediate device such as a modem. The speed test may be used to verify whether the determined data transfer rates match specified data transfer rates.

BRIEF DESCRIPTION OF DRAWINGS

Features of the present disclosure are illustrated by way of example and not limited in the following figure(s), in which like numerals indicate like elements, in which:

FIG. 9 illustrates a flowchart of an example method for aggregation-based speed testing in accordance with an example of the present disclosure.

DETAILED DESCRIPTION

Figure 1:
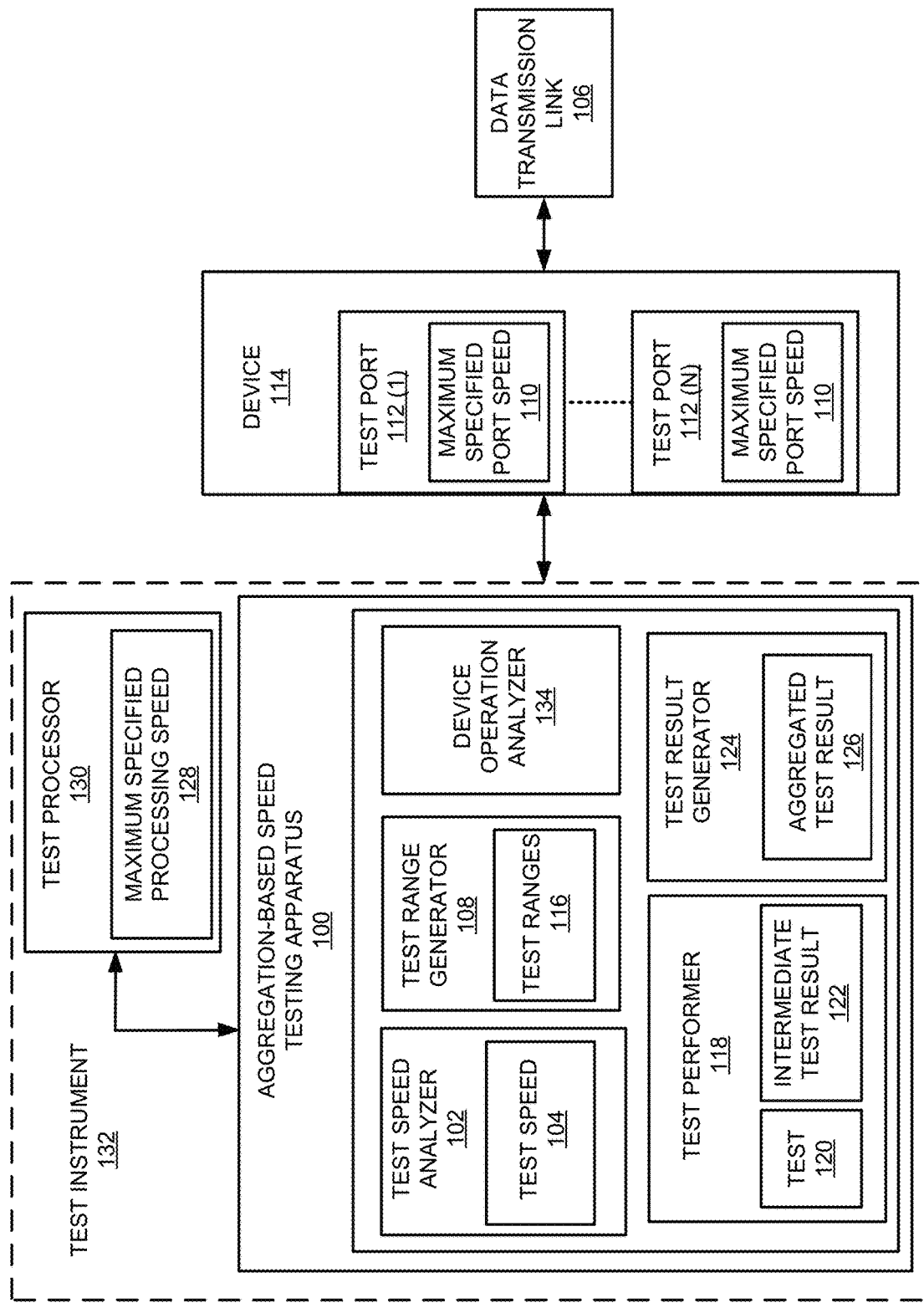
FIG. 1 illustrates an architectural layout of an aggregation-based speed testing apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Aggregation-based speed testing apparatuses, methods for aggregation-based speed testing, and non-transitory computer readable media for aggregation-based speed testing are disclosed herein. The apparatuses, methods, and non-transitory computer readable media disclosed herein provide for implementation of two or more simultaneous speed tests over different physical interfaces to overcome the technical challenge of a maximum port speed associated with a port of a device that is operatively connected to a data transmission link, or a maximum processing speed associated with a test processor of a test instrument, and yet delivering a speed test that includes a higher overall speed compared to any port of the device, or any test processor of the test instrument. For example, assuming that a test device includes ports that are rated at 1 gigabit per second (Gbps) maximum, whereas the test device is connected to a data transmission link that includes a maximum specified data transfer rate of 2 Gbps, the apparatuses, methods, and non-transitory computer readable media disclosed herein provide for implementation of two or more simultaneous speed tests (e.g., 1 Gbps each, or another test range as disclosed herein) to deliver a 2 Gbps speed test. Examples of speed tests that may be performed may include Transmission Control Protocol (TCP), User Datagram Protocol (UDP), and other types of speed tests.

For the apparatuses, methods, and non-transitory computer readable media disclosed herein, generally, a specified test speed n that corresponds to a maximum specified data transfer rate for a data transmission link that is to be tested may be divided into x test ranges as disclosed herein based, for example, on factors such as a maximum specified port speed for ports that are to be utilized, a maximum specified processing speed for test processors that are to be utilized, and other such speed limitations for components that are to be utilized. For example, a speed test for a test speed of n may be divided equally into x test ranges (e.g., $x=n/2$, $x=n/3, \ldots, x=n/y$, where y is an integer greater than 1). Alternatively, a speed test for a test speed of n may be divided into x unequal test ranges. Alternatively, a speed test for a test speed of n may be divided into x equal and y unequal test ranges. Generally, a speed test for a test speed of n may be divided into any combination of equal or unequal test ranges.

For the apparatuses, methods, and non-transitory computer readable media disclosed herein, a speed test may be divided based on the capabilities of the test instrument (e.g., test processors of the test instrument). For example, if a test instrument is capable of 1 Gbps and 0.5 Gbps speed tests, for a total speed of 1.2 Gbps, the test instrument may be utilized at 1 Gbps and 0.2 Gbps to obtain the final results of the 1.2 Gbps speed test.

For the apparatuses, methods, and non-transitory computer readable media disclosed herein, the speed test may be specified to exceed the test speed to thus assure that the test instrument as disclosed herein measures at least the test speed that is to be measured. Thus resources of the apparatus 100 may be controlled to exceed the test speed that is to be measured.

For the apparatuses, methods, and non-transitory computer readable media disclosed herein, the test instrument as disclosed herein may be utilized to certify a true speed of a device. For example, assuming that a test speed to be measured is specified at 1 Gbps, but is actually at 1.5 Gbps, then the test instrument may be operated at a relatively higher speed (e.g., 1.2 Gbps) to determine the actual speed. If the actual speed is determined to be 1.2 Gbps, it can be assumed that the actual speed may be higher. In this regard, the test instrument may be operated at a further higher speed (e.g., 2.0 Gbps) to determine the actual speed. If the actual speed is determined to be 1.5 Gbps, it can be assumed that the actual speed is actually 1.5 Gbps.

For the apparatus, methods, and non-transitory computer readable media disclosed herein, the elements of the apparatus, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates an architectural layout of an aggregation-based speed testing apparatus (hereinafter also referred to as "apparatus 100") in accordance with an example of the present disclosure.

Referring to FIG. 1, the apparatus 100 may include a test speed analyzer 102 that is executed by at least one hardware processor (e.g., the hardware processor 802 of FIG. 8, and/or the hardware processor 1004 of FIG. 10), to ascertain a test speed 104 that corresponds to a maximum specified data transfer rate for a data transmission link 106 that is to be tested.

According to examples disclosed herein, the test speed analyzer 102 may ascertain the test speed 104 that corresponds to the maximum specified data transfer rate for an Internet connection.

A test range generator 108 that is executed by at least one hardware processor (e.g., the hardware processor 802 of FIG. 8, and/or the hardware processor 1004 of FIG. 10) may determine a maximum specified port speed 110 of at least one test port 112 (illustrated in FIG. 1 as test port (1), . . . , test port (n)) of a device 114 connected to the data transmission link 106 that is to be tested. Alternatively, the maximum specified port speed 110 may be for a test instrument 132 itself as disclosed herein. The test range generator 108 may determine whether the maximum specified port speed 110 is less than the test speed 104. Based on a determination that the maximum specified port speed 110 is less than the test speed 104, the test range generator 108 may divide the test speed 104 into a plurality of test ranges 116. A total value of the plurality of test ranges 116 may be at least equal to the test speed 104.

According to examples disclosed herein, the test range generator 108 may divide the test speed 104 into the plurality of test ranges 116 by dividing the test speed 104 into the plurality of test ranges 116 that include equal test ranges.

According to examples disclosed herein, the test range generator 108 may divide the test speed 104 into the plurality of test ranges 116 by dividing the test speed 104 into the plurality of test ranges 116 that include unequal test ranges.

According to examples disclosed herein, the test range generator 108 may divide the test speed 104 into the plurality of test ranges 116 by dividing the test speed 104 into the plurality of test ranges 116 that include random test ranges.

According to examples disclosed herein, the total value of the plurality of test ranges 116 may be exactly equal to the test speed 104.

According to examples disclosed herein, the total value of the plurality of test ranges 116 may be greater than the test speed 104.

A test performer 118 that is executed by at least one hardware processor (e.g., the hardware processor 802 of FIG. 8, and/or the hardware processor 1004 of FIG. 10) may perform a test 120 corresponding to each test range of the plurality of test ranges 116. The test performer 118 may obtain an intermediate test result 122 for each test range of the plurality of test ranges 116.

According to examples disclosed herein, the test performer 118 may perform the test 120 corresponding to each test range of the plurality of test ranges 116 by initiating the test 120 corresponding to each test range of the plurality of test ranges 116 at a same time (or within a specified time difference, such as <5 seconds apart). Further, the test performer 118 may perform the test 120 corresponding to each test range of the plurality of test ranges 116 for a same time duration.

A test result generator 124 that is executed by at least one hardware processor (e.g., the hardware processor 802 of FIG. 8, and/or the hardware processor 1004 of FIG. 10) may generate, based on aggregation of each intermediate test result 122 for each test range of the plurality of test ranges 116, an aggregated test result 126 that represents an actual speed associated with the data transmission link 106.

According to examples disclosed herein, the test range generator 108 may determine a maximum specified processing speed 128 of at least one test processor 130 of the test instrument 132. This aspect may provide for testing of the data transmission link 106 based on the maximum specified processing speed 128 of the at least one test processor 130 of the test instrument 132. In this regard, the test range generator 108 may determine whether the maximum specified processing speed 128 of the at least one test processor 130 of the test instrument 132 is less than the test speed 104. Further, based on a determination that the maximum specified processing speed 128 of the at least one test processor 130 of the test instrument 132 is less than the test speed 104, the test range generator 108 may divide the test speed 104 into a plurality of test ranges 116 corresponding to the at least one test processor 130. In this regard, a total value of the plurality of test ranges 116 may be at least equal to the test speed 104.

According to examples disclosed herein, the test performer 118 may perform, for the at least one test processor 130, a test 120 corresponding to each test range of the plurality of test ranges 116. The test performer 118 may obtain an intermediate test result 122 for each test range of the plurality of test ranges 116.

According to examples disclosed herein, the test result generator 124 may generate, based on aggregation of each intermediate test result 122 for each test range of the plurality of test ranges 116, an aggregated test result 126 that represents an actual speed associated with the data transmission link 106.

In order to test operation of the device 114 (e.g., determine whether the device 114 is operating correctly or incorrectly), once the data transmission link 106 is tested based on the maximum specified processing speed 128 of the at least one test processor 130 of the test instrument 132, the test speed analyzer 102 may determine the maximum specified port speed 110 of at least one test port 112 of the device 114 connected to the data transmission link 106. In this regard, the test range generator 108 may determine whether the maximum specified port speed 110 is less than the test speed 104. Based on a determination that the maximum specified port speed 110 is less than the test speed 104, the test range generator 108 may divide the test speed 104 into a plurality of further test ranges (e.g., similar or different from the test ranges 116). A total further value of the plurality of further test ranges may be at least equal to the test speed 104. The test performer 118 may perform a further test corresponding to each further test range of the plurality of further test ranges. The test performer 118 may obtain an intermediate further test result for each further test range of the plurality of further test ranges. The test result generator 124 may generate, based on aggregation of each intermediate further test result for each further test range of the plurality of further test ranges, an aggregated further test result that represents an actual further speed associated with the data transmission link 106.

A device operation analyzer 134 that is executed by at least one hardware processor (e.g., the hardware processor 802 of FIG. 8, and/or the hardware processor 1004 of FIG. 10) may determine whether the actual further speed is less than the actual speed. Based on a determination that the actual further speed is less than the actual speed, the device operation analyzer 134 may generate an indication that the device 114 is operating incorrectly.

According to examples disclosed herein, the device operation analyzer 134 may determine whether the actual further speed is greater than or equal to the actual speed. Based on a determination that the actual further speed is greater than or equal to the actual speed, the device operation analyzer 134 may generate an indication that the device 114 is operating correctly.

Operation of the apparatus 100 is described in further detail with reference to FIGS. 1-7.

FIGS. 2-5 illustrate performance of speed tests including a device connected to a data transmission link to illustrate operation of the aggregation-based speed testing apparatus of FIG. 1 in accordance with an example of the present disclosure.

Figure 2:
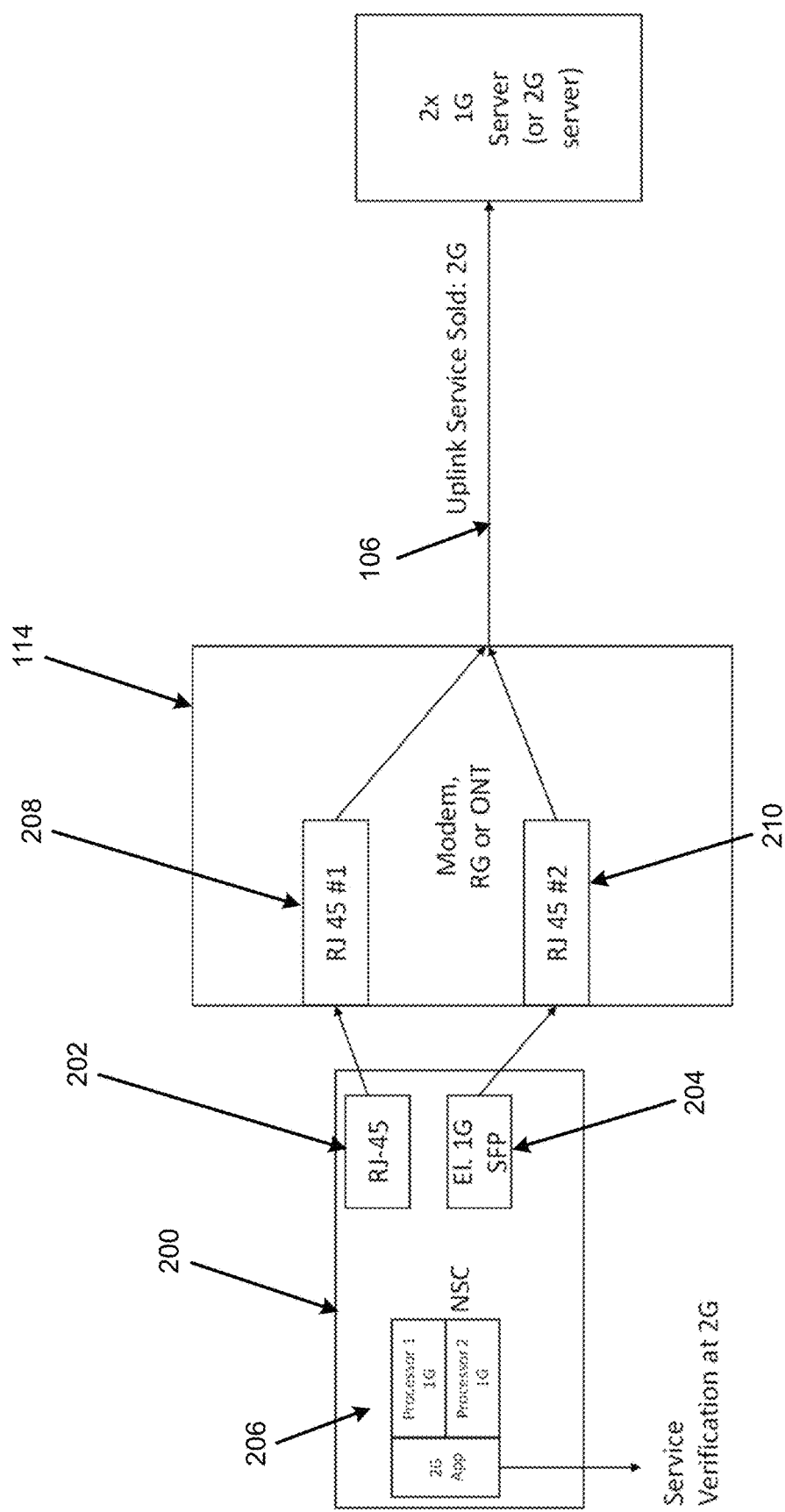
FIGS. 2-5 illustrate performance of speed tests including a device connected to a data transmission link to illustrate operation of the aggregation-based speed testing apparatus of FIG. 1 in accordance with an example of the present disclosure.

Referring to FIGS. 1-5, and particularly FIG. 2, an example of implementation of the apparatus 100 for a network and service companion (NSC) 200 is disclosed. The NSC 200 may include a 1 Gbps port 202 (e.g., an RJ-45, or another type of port), and additionally support a 1 Gbps optical/electrical Ethernet small form-factor pluggable (SFP) 204 in the SFP cage. Both of these interfaces may include a 1 Gbps path to one processor (e.g., an i.mx 8, or another type of 2 Gbps processor) at 206. Thus, the processor may run at least a 2 Gbps speed test. In this regard, as disclosed herein, the test speed analyzer 102 may ascertain a test speed 104 of 2 Gbps that corresponds to a maximum specified data transfer rate of 2 Gbps for the data transmission link 106 that is to be tested. It is noted that the 2 Gbps maximum specified data transfer rate is provided as an example, and the maximum specified data transfer rate may be higher or lower than 2 Gbps. For example, the maximum specified data transfer rate may be specified at 10 Gbps (or more) for an optical Ethernet link. The test range generator 108 may determine a maximum specified port speed 110 of 1 Gbps of at least one test port 112 (e.g., ports 208 and 210) of device 114 connected to the data transmission link 106 that is to be tested. In this regard, the device 114 may be a modem, a residential gateway (RG), an optical network terminal (ONT), or another such device. Alternatively, the maximum specified port speed 110 may be for the test instrument 132 itself as disclosed herein (e.g., for ports 202 and 204). The test range generator 108 may determine whether the maximum specified port speed 110 is less than the test speed 104 (e.g., 1 Gbps<2 Gbps). Based on a determination that the maximum specified port speed 110 is less than the test speed 104, the test range generator 108 may divide the test speed 104 into a plurality of test ranges 116 (e.g., test ranges of 1 Gbps each, or another test range as disclosed herein). A total value of the plurality of test ranges 116 may be at least equal to the test speed 104 (e.g., 1 Gbps+1 Gbps=2 Gbps). According to examples disclosed herein, the test range generator 108 may divide the test speed 104 into the plurality of test ranges 116 by dividing the test speed 104 into the plurality of test ranges 116 that include equal test ranges (e.g., two test ranges of 1 Gbps each). According to examples disclosed herein, the test range generator 108 may divide the test speed 104 into the plurality of test ranges 116 by dividing the test speed 104 into the plurality of test ranges 116 that include unequal test ranges (e.g., 3 test ranges of 1 Gbps, 0.6 Gbps, and 0.4 Gbps, assuming that there are further ports). According to examples disclosed herein, the test range generator 108 may divide the test speed 104 into the plurality of test ranges 116 by dividing the test speed 104 into the plurality of test ranges 116 that include random test ranges (e.g., 3 test ranges of 0.75 Gbps, 0.55 Gbps, and 0.7 Gbps, assuming that there are further ports). According to examples disclosed herein, the total value of the plurality of test ranges 116 may be exactly equal to the test speed 104 (e.g., total value is exactly 2 Gbps). According to examples disclosed herein, the total value of the plurality of test ranges 116 may be greater than the test speed 104 (e.g., total value is 2.1 Gbps). The test performer 118 may perform a test 120 corresponding to each test range of the plurality of test ranges 116. The test 120 may be performed, for example, based on an internet/scientific standard, RFC etc. The test performer 118 may obtain an intermediate test result 122 (e.g., for test ranges of 1 Gbps, a first intermediate test result may be 0.995 Gbps, and second intermediate test result may be 0.990 Gbps) for each test range of the plurality of test ranges 116. According to examples disclosed herein, the test performer 118 may perform the test 120 corresponding to each test range of the plurality of test ranges 116 by initiating the test 120 corresponding to each test range of the plurality of test ranges 116 at a same time (e.g., at time 4:00 PM). However, for multiple instances of tests, the tests may be performed at different times as needed. Further, the test performer 118 may perform the test 120 corresponding to each test range of the plurality of test ranges 116 for a same time duration (e.g., 15 seconds). The test result generator 124 may generate, based on aggregation of each intermediate test result 122 (e.g., for test ranges of 1 Gbps, a first intermediate test result is 0.995 Gbps, and second intermediate test result is 0.990 Gbps) for each test range of the plurality of test ranges 116, an aggregated test result 126 that represents an actual speed (e.g., 0.995 Gbps+0.990 Gbps=1.985 Gbps) associated with the data transmission link 106. The example of the actual speed of 1.985 Gbps described above may be an upstream actual speed, and a downstream actual speed may be similarly determined. The actual speed may thus include upstream and downstream components based on the first intermediate test result and the second intermediate test result both including upstream and downstream components.

Referring still to FIG. 2, with respect to the test 120 performed by the test performer 118, the test performer 118 may segregate the traffic that belong to different instances of the speed test from one another, and ensure that they are flowing through the respective correct interface. For example, for the two ports 202 and 204 (e.g., RJ-45 and SFP), the test performer 118 may run two speed tests on the same processor. The first test may send and receive traffic over port 202, and the second test may send and receive traffic over port 204.

Figure 3:
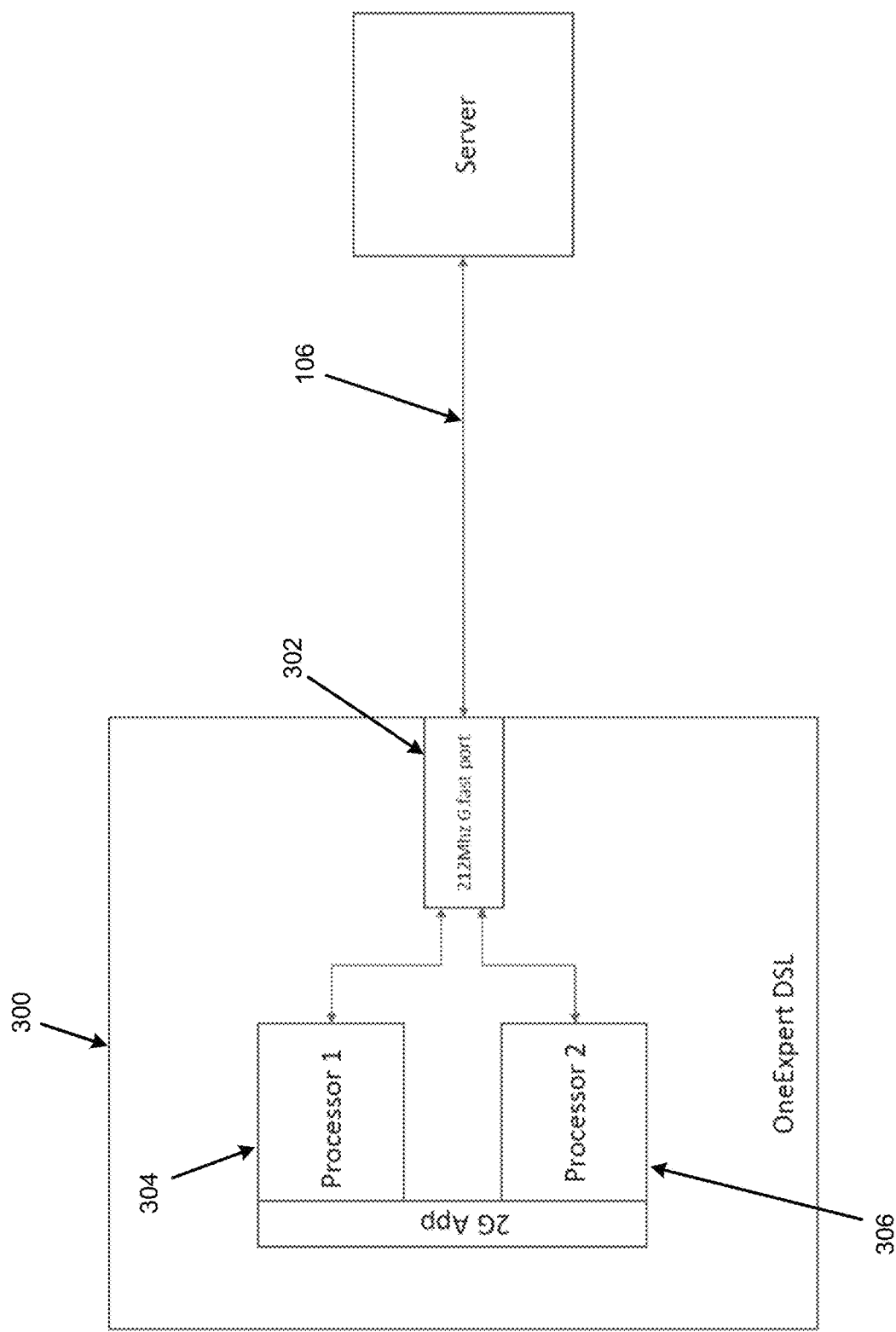

Referring to FIGS. 1-5, and particularly FIG. 3, another example of implementation of the apparatus 100 for an OneExpert DSL (ONX) 300 is disclosed. The ONX may include a 212 Mhz DSL port 302 (or another type of port) rated at least at 2 Gbps. The DSL port 302 may include a 1 Gbps path to two imx6 processors at 304 and 306, each including a 1 Gbps processing capability. In this regard, as disclosed herein, the test speed analyzer 102 may ascertain the test speed 104 of 2 Gbps that corresponds to a maximum specified data transfer rate of 2 Gbps for the data transmission link 106 that is to be tested. The test range generator 108 may determine a maximum specified processing speed 128 of 1 Gbps of at least one test processor 130 (e.g., processors 304 and 306) of the test instrument 132 (e.g., the ONX 300). The test range generator 108 may determine whether the maximum specified processing speed 128 is less than the test speed 104 (e.g., 1 Gbps<2 Gbps). Based on a determination that the maximum specified processing speed 128 is less than the test speed 104, the test range generator 108 may divide the test speed 104 into a plurality of test ranges 116 (e.g., test ranges of 1 Gbps each, or another test range as disclosed herein) corresponding to the at least one test processor 130 (e.g., processors 304 and 306). A total value of the plurality of test ranges 116 may be at least equal to the test speed 104 (e.g., 1 Gbps+1 Gbps=2 Gbps). According to examples disclosed herein, as also disclosed herein with reference to FIG. 2, the test range generator 108 may divide the test speed 104 into the plurality of test ranges 116 by dividing the test speed 104 into the plurality of test ranges 116 that include equal test ranges (e.g., two test ranges of 1 Gbps each). According to examples disclosed herein, the test range generator 108 may divide the test speed 104 into the plurality of test ranges 116 by dividing the test speed 104 into the plurality of test ranges 116 that include unequal test ranges (e.g., 3 test ranges of 1 Gbps, 0.6 Gbps, and 0.4 Gbps, assuming that there are further test processors). According to examples disclosed herein, the test range generator 108 may divide the test speed 104 into the plurality of test ranges 116 by dividing the test speed 104 into the plurality of test ranges 116 that include random test ranges (e.g., 3 test ranges of 0.75 Gbps, 0.55 Gbps, and 0.7 Gbps, assuming that there are further test processors). According to examples disclosed herein, the total value of the plurality of test ranges 116 may be exactly equal to the test speed 104 (e.g., total value is exactly 2 Gbps). According to examples disclosed herein, the total value of the plurality of test ranges 116 may be greater than the test speed 104 (e.g., total value is 2.2 Gbps). The test performer 118 may perform a test 120 corresponding to each test range of the plurality of test ranges 116. The test performer 118 may obtain an intermediate test result 122 (e.g., for test ranges of 1 Gbps, a first intermediate test result may be 0.985 Gbps, and second intermediate test result may be 0.990 Gbps) for each test range of the plurality of test ranges 116. According to examples disclosed herein, the test performer 118 may perform the test 120 corresponding to each test range of the plurality of test ranges 116 by initiating the test 120 corresponding to each test range of the plurality of test ranges 116 at a same time (e.g., at time 3:00 PM). Further, the test performer 118 may perform the test 120 corresponding to each test range of the plurality of test ranges 116 for a same time duration (e.g., 20 seconds). The test result generator 124 may generate, based on aggregation of each intermediate test result 122 (e.g., for test ranges of 1 Gbps, a first intermediate test result is 0.985 Gbps, and second intermediate test result is 0.990 Gbps) for each test range of the plurality of test ranges 116, an aggregated test result 126 that represents an actual speed (e.g., 0.985 Gbps+0.990 Gbps=1.975 Gbps) associated with the data transmission link 106.

Referring still to FIG. 3, with respect to the test 120 performed by the test performer 118, since the instances of speed tests are executed on different processors, the test performer 118 may synchronize the start times of the speed tests, and monitor their lock step progress. For FIG. 3, the processor 306 may be housed inside the same semiconductor chip as the 212 Mhz modem. The test performer 118 may establish a speed test 1 on Processor 1 at 304 and direct traffic to/from Processor 1 and the 212 Mhz modem, and rely on the chipset to multiplex/de-multiplex the traffic belonging to the two speed tests.

Figure 4:
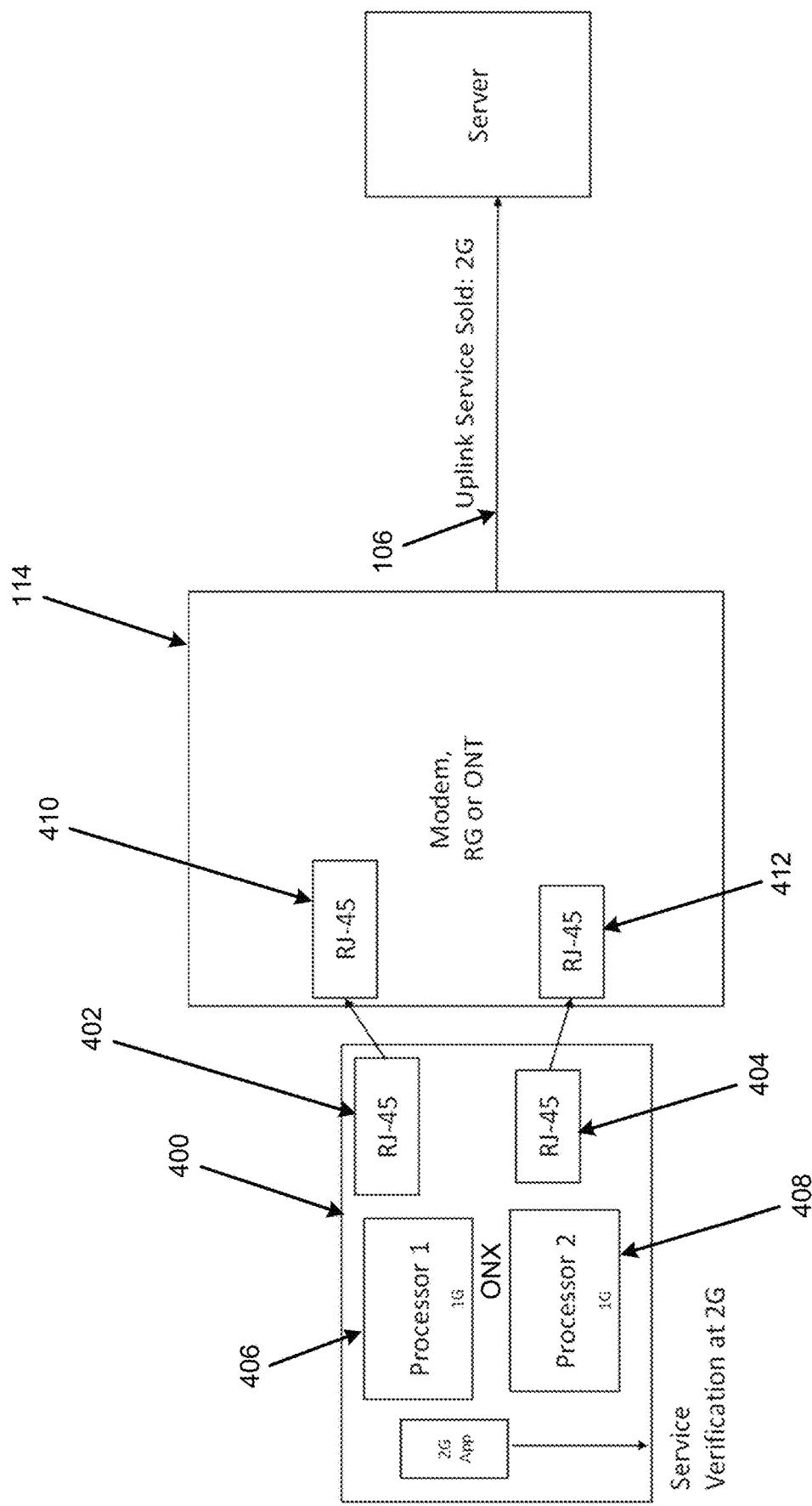

Referring to FIGS. 1-5, and particularly FIG. 4, another example of implementation of the apparatus 100 for an ONX 400 is disclosed. The ONX 400 may include two 1 Gbps ports 402 and 404 (e.g., RJ-45, or other types of ports). Both of these interfaces may include a 1 Gbps path to one processor each at 406 and 408 (e.g., an i.mx 8, or another type of processor). In this regard, as disclosed herein, the test speed analyzer 102 may ascertain a test speed 104 of 2 Gbps that corresponds to a maximum specified data transfer rate of 2 Gbps for the data transmission link 106 that is to be tested. The test range generator 108 may determine a maximum specified port speed 110 of 1 Gbps of at least one test port 112 (e.g., ports 410 and 412) of device 114 connected to the data transmission link 106 that is to be tested. Alternatively, the maximum specified port speed 110 may be for the test instrument 132 itself as disclosed herein (e.g., for ports 402 and 404). The test range generator 108 may determine whether the maximum specified port speed 110 is less than the test speed 104 (e.g., 1 Gbps<2 Gbps). Based on a determination that the maximum specified port speed 110 is less than the test speed 104, the test range generator 108 may divide the test speed 104 into a plurality of test ranges 116 (e.g., test ranges of 1 Gbps each, or another test range as disclosed herein), in a similar manner as disclosed herein with respect to FIG. 2. Alternatively, assuming that the processors 406 and 408 are also capable of 1 Gbps maximum performance, the analysis described above by the test range generator 108 may be based on the maximum specified processing speed 128 as disclosed above with respect to FIG. 3. The test performer 118 may perform a test 120 corresponding to each test range of the plurality of test ranges 116, in a similar manner as disclosed herein with respect to FIG. 2. In a similar manner as disclosed herein with respect to FIG. 2, the test result generator 124 may generate, based on aggregation of each intermediate test result 122 (e.g., for test ranges of 1 Gbps, a first intermediate test result is 0.995 Gbps, and second intermediate test result is 0.990 Gbps) for each test range of the plurality of test ranges 116, an aggregated test result 126 that represents an actual speed (e.g., 0.995 Gbps+0.990 Gbps=1.985 Gbps) associated with the data transmission link 106.

Referring still to FIG. 4, with respect to the test 120 performed by the test performer 118, since the instances of speed tests are executed on different processors, the test performer 118 may synchronize the start times of the speed tests, and monitor their lock step progress. The test performer 118 may utilize an internal Ethernet switch in the ONX to carry speed test 1 traffic from processor 1 at 406 to/from RJ45 port 1 at 402, and speed test 2 traffic from processor 2 at 408 to/from RJ45 port 2 at 404, to segregate the speed tests.

Figure 5:
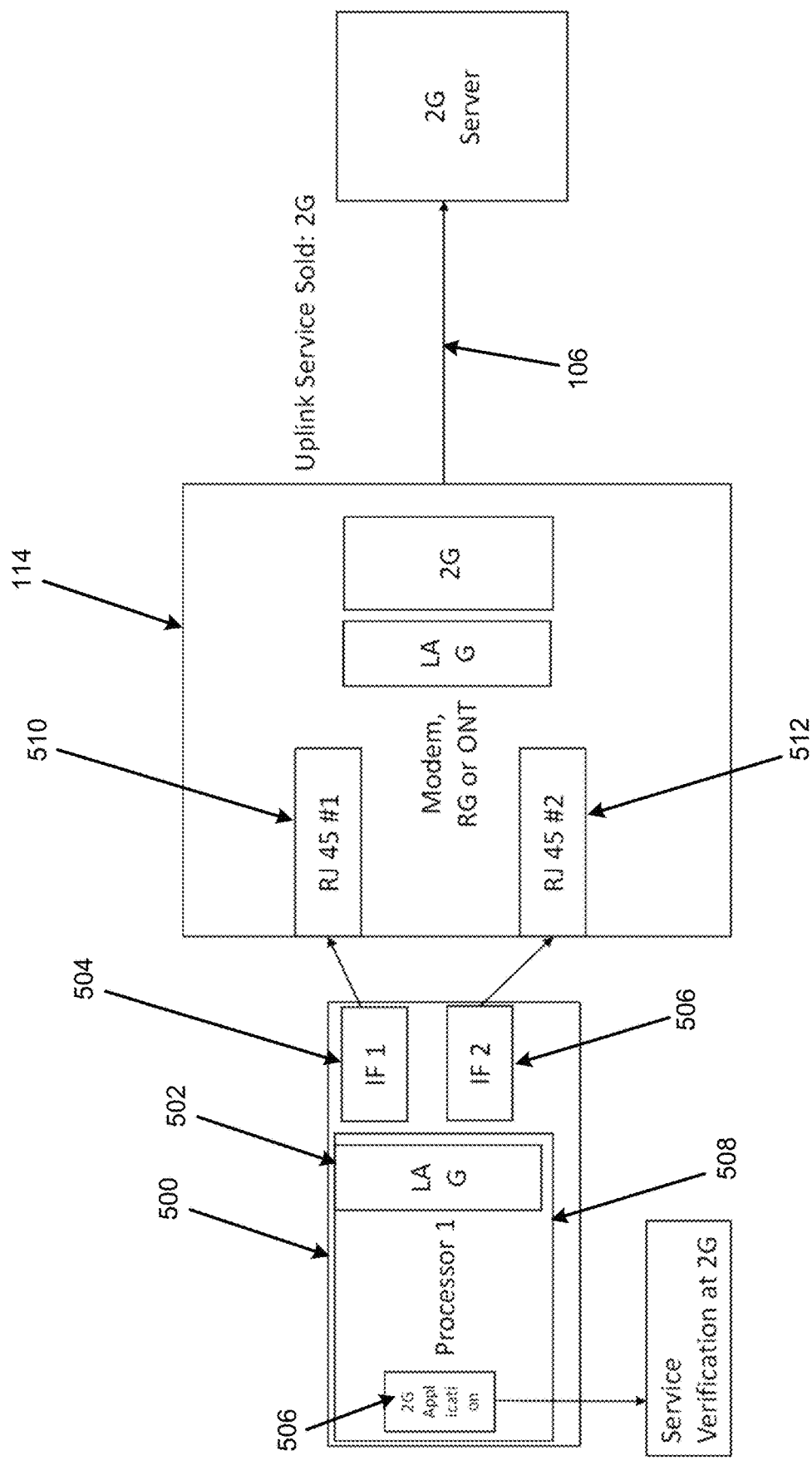

Referring to FIGS. 1-5, and particularly FIG. 5, another example of implementation of the apparatus 100 for an NSC 500 is disclosed. Compared to the example of FIG. 2 that implements two 1 Gbps speed tests, the example of FIG. 5 includes a single 2 Gbps speed test. However, for FIG. 5 that utilizes a link aggregation protocol at 502, traffic is divided between interface 1 at 504 and interface 2 at 506. Both of these interfaces may include a 1 Gbps path to a 2 Gbps processor at 508. In this regard, as disclosed herein, the test speed analyzer 102 may ascertain a test speed 104 of 2 Gbps that corresponds to a maximum specified data transfer rate of 2 Gbps for the data transmission link 106 that is to be tested. The test range generator 108 may determine a maximum specified port speed 110 of 1 Gbps of at least one test port 112 (e.g., ports 510 and 512) of device 114 connected to the data transmission link 106 that is to be tested. Alternatively, the maximum specified port speed 110 may be for the test instrument 132 itself as disclosed herein (e.g., for interfaces 504 and 506). The test range generator 108 may determine whether the maximum specified port speed 110 is less than the test speed 104 (e.g., 1 Gbps<2 Gbps). Based on a determination that the maximum specified port speed 110 is less than the test speed 104, the test range generator 108 may divide the test speed 104 into a plurality of test ranges 116 (e.g., test ranges of 1 Gbps each, or another test range as disclosed herein), in a similar manner as disclosed herein with respect to FIG. 2. The test performer 118 may perform a test 120 corresponding to each test range of the plurality of test ranges 116, in a similar manner as disclosed herein with respect to FIG. 2. In a similar manner as disclosed herein with respect to FIG. 2, the test result generator 124 may generate, based on aggregation of each intermediate test result 122 (e.g., for test ranges of 1 Gbps, a first intermediate test result may be 0.995 Gbps, and second intermediate test result may be 0.990 Gbps) for each test range of the plurality of test ranges 116, an aggregated test result 126 that represents an actual speed (e.g., 0.995 Gbps+0.990 Gbps=1.985 Gbps) associated with the data transmission link 106.

Figure 6:
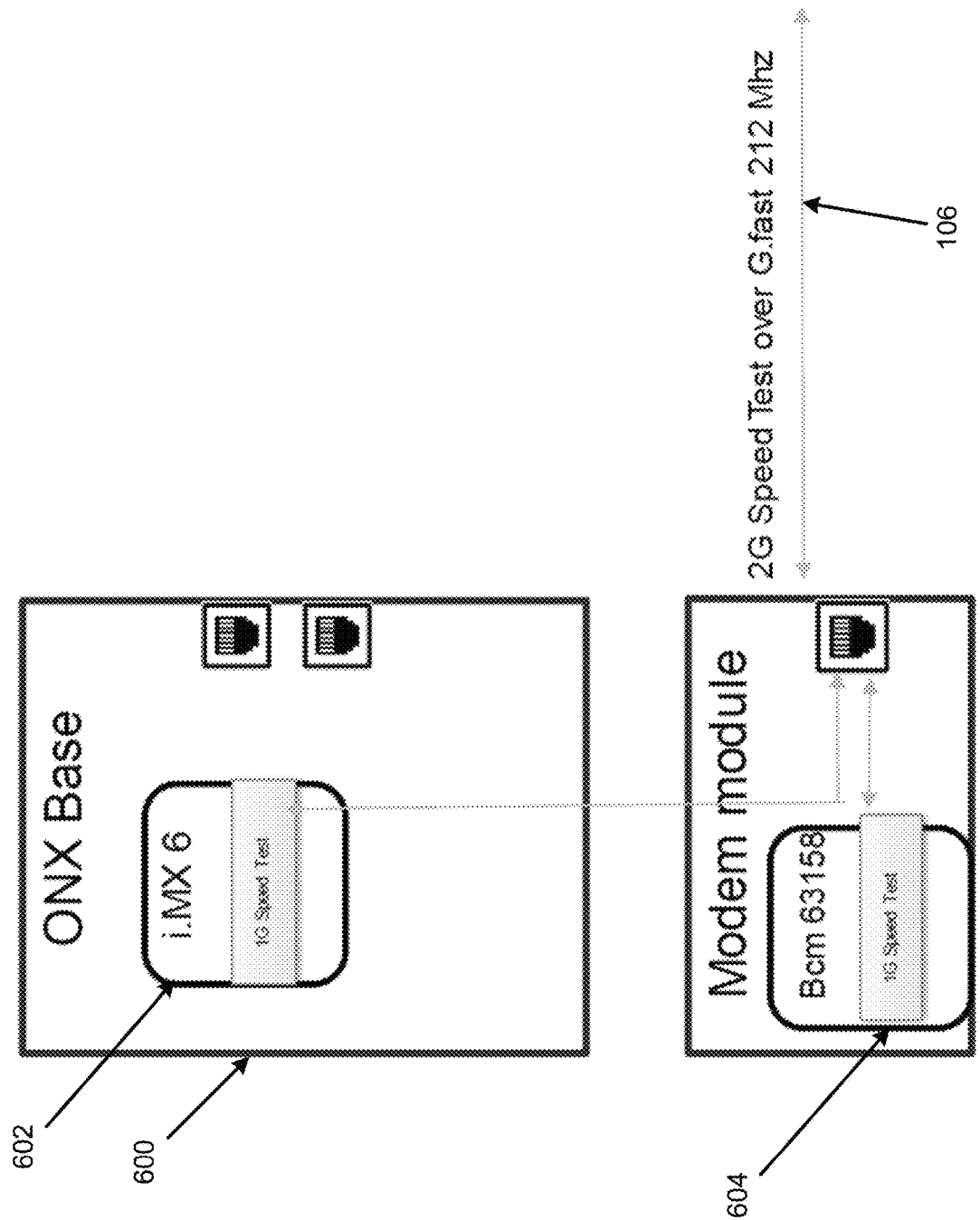
FIGS. 6 and 7 illustrate performance of speed tests based on a direct connection to the data transmission link to illustrate operation of the aggregation-based speed testing apparatus of FIG. 1 in accordance with an example of the present disclosure.
Figure 7:
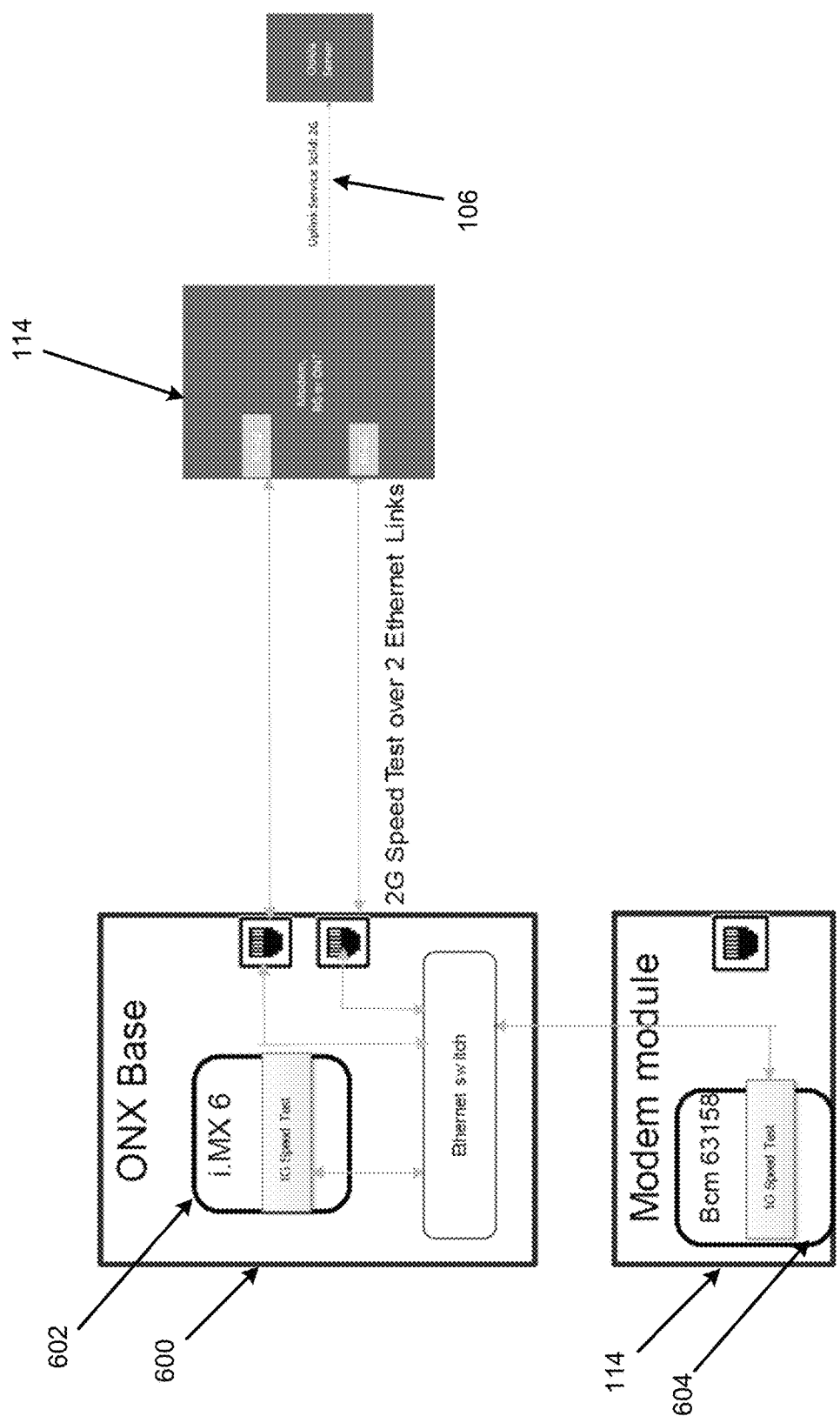

FIGS. 6 and 7 illustrate performance of speed tests based on a direct connection to the data transmission link to illustrate operation of the apparatus 100 in accordance with an example of the present disclosure.

Referring to FIGS. 1 and 6, and particularly FIG. 6, an example of implementation of the apparatus 100 for an ONX base 600 is disclosed. Compared to the configuration of FIGS. 2-5 that includes the device 114 disposed between the test instrument 132 (e.g., NSC), the configuration of FIG. 6 may include no device 114 disposed between the ONX base 600 (or another type of base) and the data transmission link 106 that is to be tested (e.g., the data transmission link 106 is connected directly to the test instrument 132 that includes the ONX base and the modem module). In this manner, the device operation analyzer 134 may determine whether the device 114 (e.g., as shown in FIG. 2) is operating correctly or incorrectly as disclosed herein.

Specifically, referring to FIG. 6, the ONX base 600 may include a processor 602 (e.g., an i.mx 6, or another type of processor) capable of a 1 Gbps speed test, and the modem module may include a processor 604 (e.g., a Broadcom 63158, or another type of processor) similarly capable of a 1 Gbps speed test. In this regard, similar to the example of FIG. 4, the capabilities of the processors 602 and 604 may be aggregated as disclosed herein to perform, for example, a 2 Gbps speed test. For example, the test speed analyzer 102 may ascertain the test speed 104 of 2 Gbps that corresponds to a maximum specified data transfer rate of 2 Gbps for the data transmission link 106 that is to be tested. The test range generator 108 may determine a maximum specified processing speed 128 of 1 Gbps of at least one test processor 130 (e.g., processors 602 and 604) of the test instrument 132 (e.g., the ONX base and the model module). The test range generator 108 may determine whether the maximum specified processing speed 128 is less than the test speed 104 (e.g., 1 Gbps<2 Gbps). Based on a determination that the maximum specified processing speed 128 is less than the test speed 104, the test range generator 108 may divide the test speed 104 into a plurality of test ranges 116 (e.g., test ranges of 1 Gbps each, or another test range as disclosed herein) corresponding to the at least one test processor 130 (e.g., processors 602 and 604), in a similar manner as disclosed herein with respect to FIG. 3. The test result generator 124 may generate, based on aggregation of each intermediate test result 122 (e.g., for test ranges of 1 Gbps, a first intermediate test result may be 0.985 Gbps, and second intermediate test result may be 0.990 Gbps) for each test range of the plurality of test ranges 116, an aggregated test result 126 that represents an actual speed (e.g., 0.985 Gbps+0.990 Gbps=1.975 Gbps) associated with the data transmission link 106.

Comparing the results of FIGS. 6 and 2 (assuming that the actual speed determined for FIG. 2 was 1.815 Gbps), the device operation analyzer 134 may determine whether the actual speed determined from the analysis associated with FIG. 2 is less than the actual speed determined from the analysis associated with FIG. 6. Based on a determination that the FIG. 2 actual speed is less than the FIG. 6 actual speed, the device operation analyzer 134 may generate an indication that the device 114 is operating incorrectly (e.g., due to the drop from 1.975 Gbps to 1.815 Gbps). However, if the FIG. 2 actual speed is greater than or equal to the FIG. 6 actual speed, the device operation analyzer 134 may generate an indication that the device 114 is operating correctly.

Referring next to FIG. 7, in a similar manner as FIG. 6, the capabilities of the processors 602 and 604 may be aggregated as disclosed herein to perform, for example, a 2 Gbps speed test. However, compared to FIG. 6, for FIG. 7, the data transmission link 106 may be connected to a device 114. The test speed analyzer 102 may ascertain the test speed 104 of 2 Gbps that corresponds to a maximum specified data transfer rate of 2 Gbps for the data transmission link 106 that is to be tested. The test range generator 108 may determine a maximum specified processing speed 128 of 1 Gbps of at least one test processor 130 (e.g., processors 602 and 604) of the test instrument 132 (e.g., the ONX base and the model module). The test range generator 108 may determine whether the maximum specified processing speed 128 is less than the test speed 104 (e.g., 1 Gbps<2 Gbps). Based on a determination that the maximum specified processing speed 128 is less than the test speed 104, the test range generator 108 may divide the test speed 104 into a plurality of test ranges 116 (e.g., test ranges of 1 Gbps each, or another test range as disclosed herein) corresponding to the at least one test processor 130 (e.g., processors 602 and 604), in a similar manner as disclosed herein with respect to FIG. 3. The test result generator 124 may generate, based on aggregation of each intermediate test result 122 (e.g., for test ranges of 1 Gbps, a first intermediate test result may be 0.905 Gbps, and second intermediate test result may be 0.910 Gbps) for each test range of the plurality of test ranges 116, an aggregated test result 126 that represents an actual speed (e.g., 0.905 Gbps+0.910 Gbps=1.815 Gbps) associated with the data transmission link 106. In this regard, the=device operation analyzer 134 may generate an indication that the device 114 is operating incorrectly (e.g., due to the drop from 1.975 Gbps of FIGS. 6 to 1.815 Gbps of FIG. 7).

Figure 8:
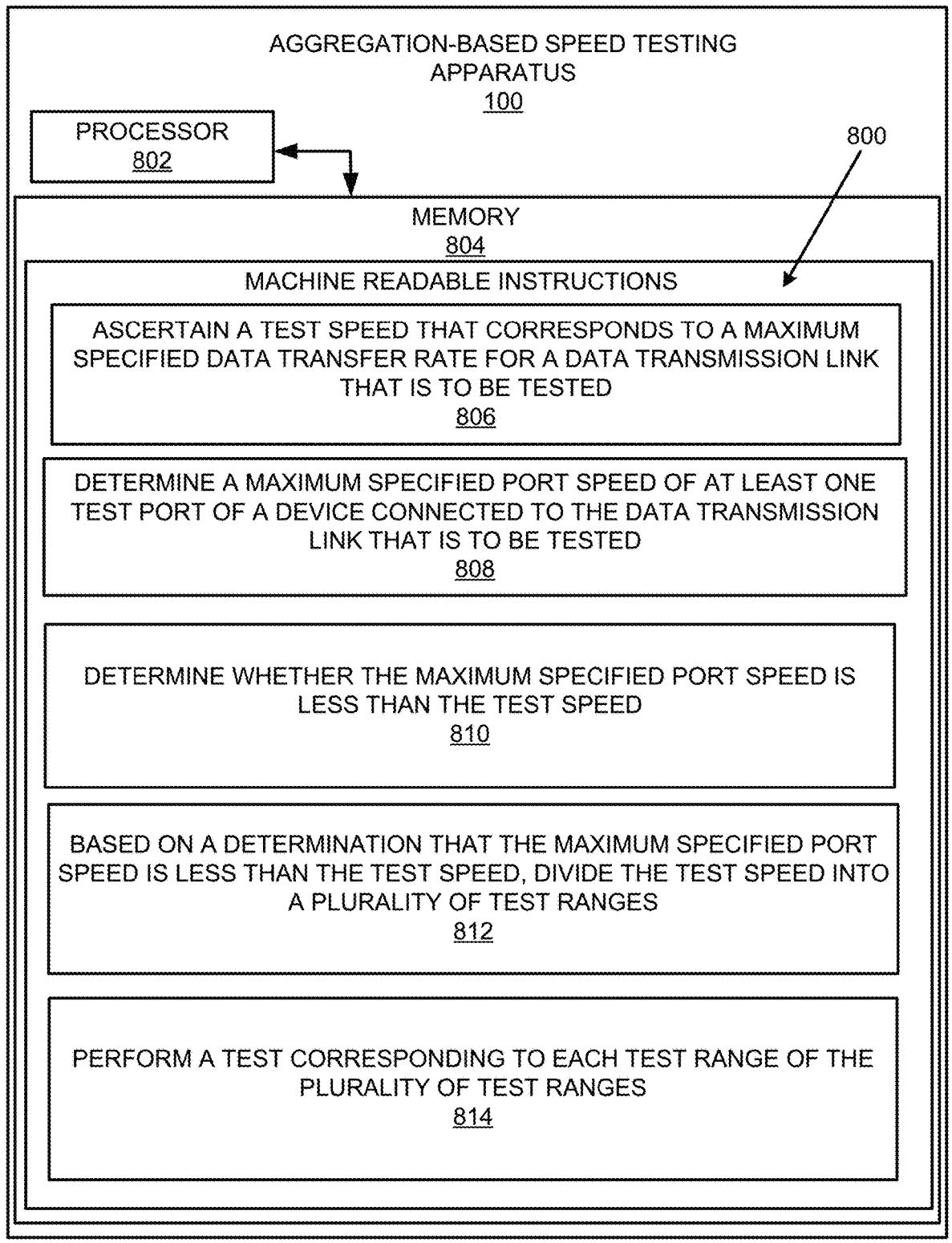
FIG. 8 illustrates an example block diagram for aggregation-based speed testing in accordance with an example of the present disclosure.
Figure 8:
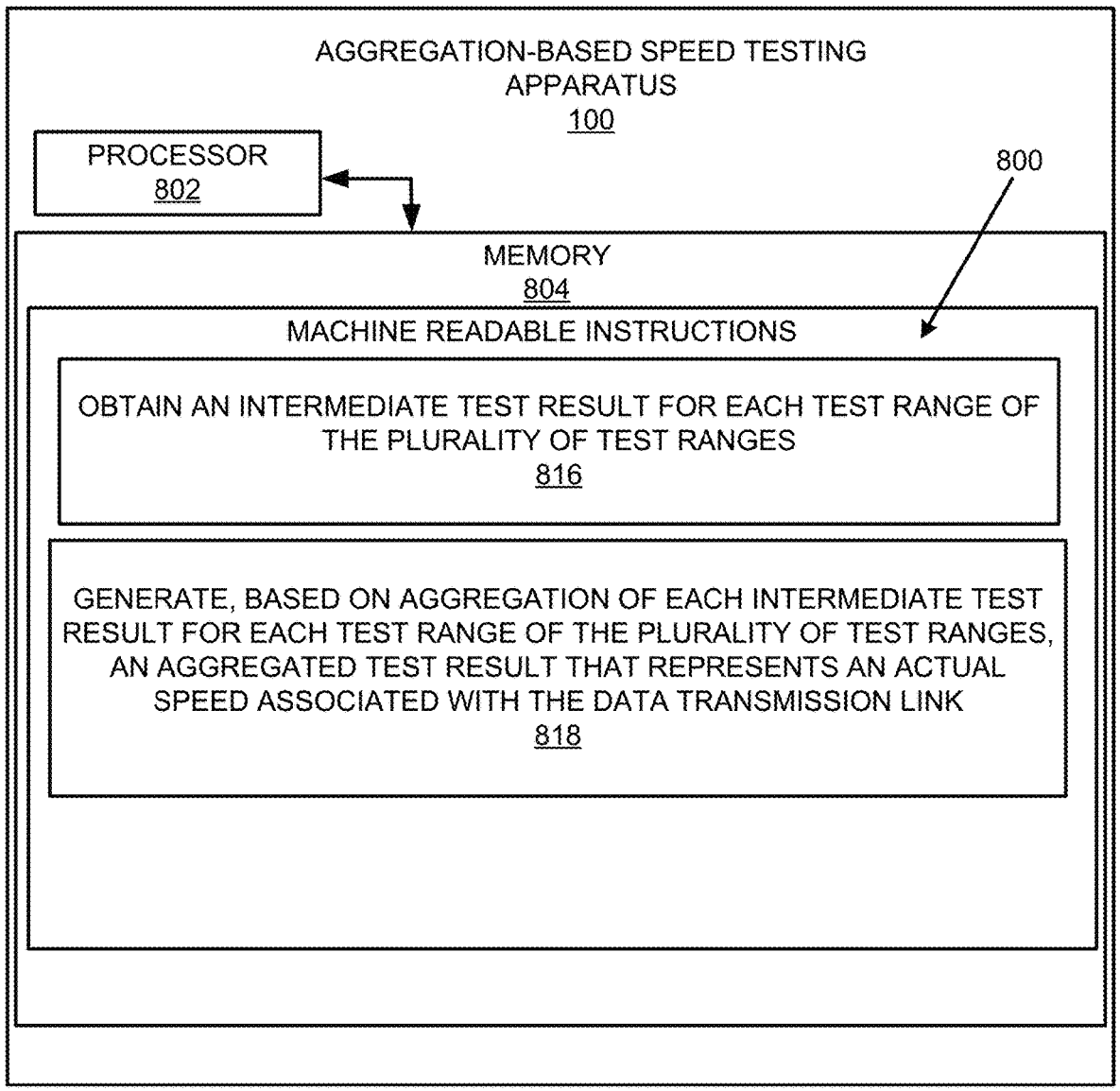
Figure 10:
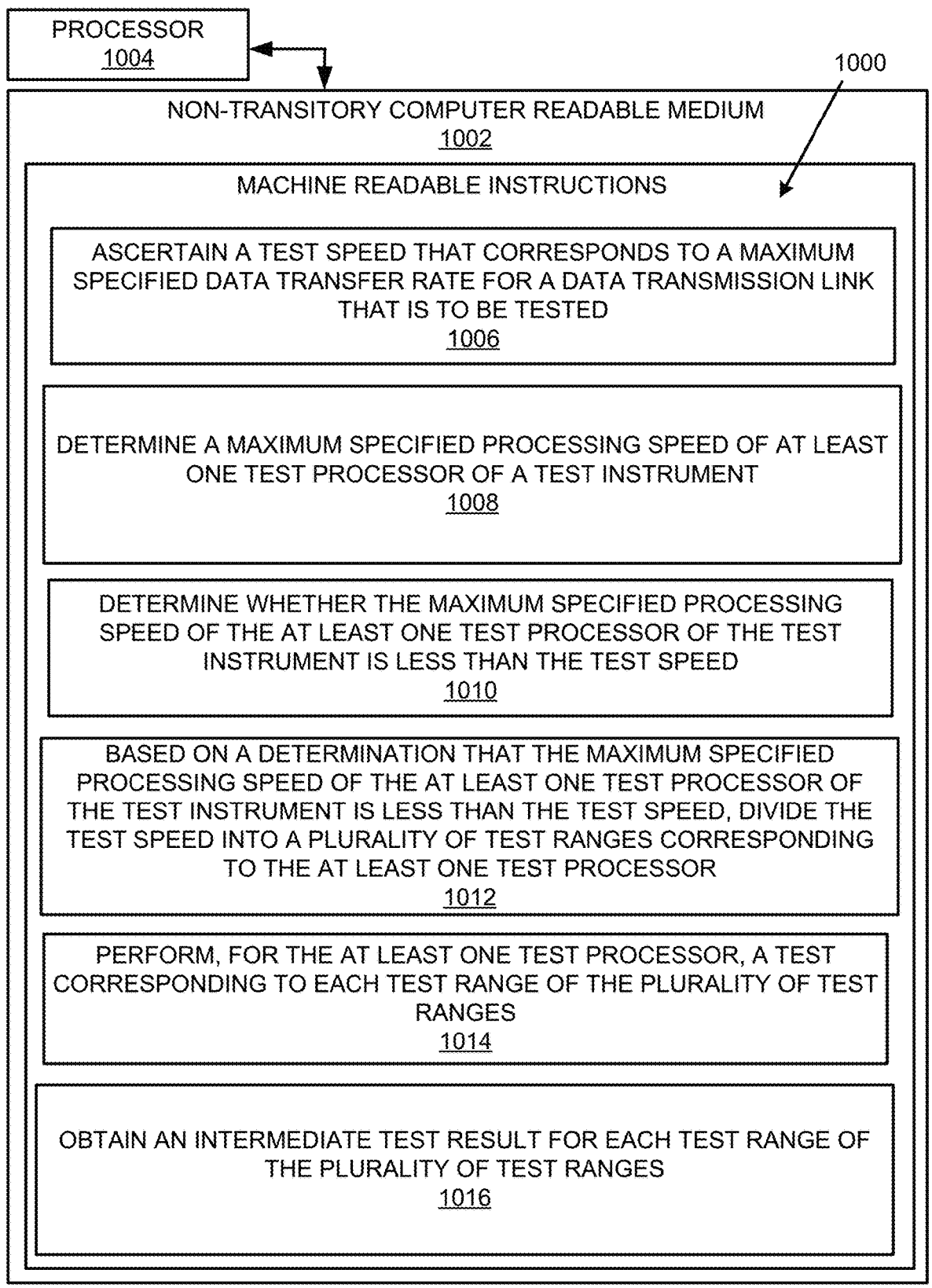
FIG. 10 illustrates a further example block diagram for aggregation-based speed testing in accordance with another example of the present disclosure.
Figure 10:
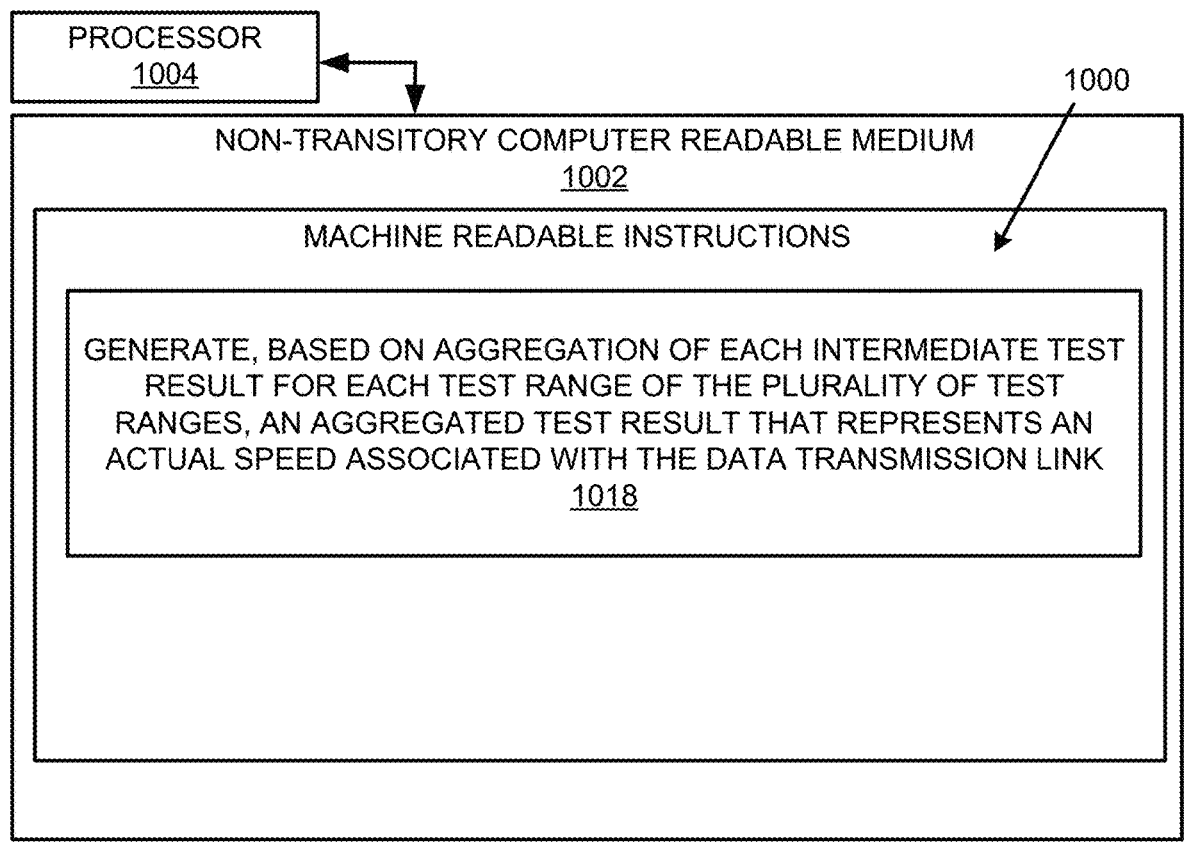

FIGS. 8-10 respectively illustrate an example block diagram 800, a flowchart of an example method 900, and a further example block diagram 1000 for aggregation-based speed testing, according to examples. The block diagram 800, the method 100, and the block diagram 1000 may be implemented on the apparatus 100 described above with reference to FIG. 1 by way of example and not of limitation. The block diagram 800, the method 900, and the block diagram 1000 may be practiced in other apparatuses. In addition to showing the block diagram 800, FIG. 8 shows hardware of the apparatus 100 that may execute the instructions of the block diagram 800. The hardware may include a processor 802, and a memory 804 storing machine readable instructions that when executed by the processor cause the processor to perform the instructions of the block diagram 800. The memory 804 may represent a non-transitory computer readable medium. FIG. 9 may represent an example method for aggregation-based speed testing, and the steps of the method. FIG. 10 may represent a non-transitory computer readable medium 1002 having stored thereon machine readable instructions to provide aggregation-based speed testing according to an example. The machine readable instructions, when executed, cause a processor 1004 to perform the instructions of the block diagram 1000 also shown in FIG. 10.

The processor 802 of FIG. 8 and/or the processor 1004 of FIG. 10 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1002 of FIG. 10), such as hardware storage devices (e.g., RAM (random access memory), ROM (read only memory), EPROM (erasable, programmable ROM), EEPROM (electrically erasable, programmable ROM), hard drives, and flash memory). The memory 804 may include a RAM, where the machine readable instructions and data for a processor may reside during runtime.

Referring to FIGS. 1-8, and particularly to the block diagram 800 shown in FIG. 8, the memory 804 may include instructions 806 to ascertain a test speed 104 that corresponds to a maximum specified data transfer rate for a data transmission link 106 that is to be tested.

The processor 802 may fetch, decode, and execute the instructions 808 to determine a maximum specified port speed 110 of at least one test port 112 of a device 114 connected to the data transmission link 106 that is to be tested.

The processor 802 may fetch, decode, and execute the instructions 810 to determine whether the maximum specified port speed 110 is less than the test speed 104.

Based on a determination that the maximum specified port speed 110 is less than the test speed 104, the processor 802 may fetch, decode, and execute the instructions 812 to divide the test speed 104 into a plurality of test ranges 116.

The processor 802 may fetch, decode, and execute the instructions 814 to perform a test 120 corresponding to each test range of the plurality of test ranges 116.

The processor 802 may fetch, decode, and execute the instructions 816 to obtain an intermediate test result 122 for each test range of the plurality of test ranges 116.

The processor 802 may fetch, decode, and execute the instructions 818 to generate, based on aggregation of each intermediate test result 122 for each test range of the plurality of test ranges 116, an aggregated test result 126 that represents an actual speed associated with the data transmission link 106.

Referring to FIGS. 1-7 and 9, and particularly FIG. 9, for the method 900, at block 902, the method may include ascertaining, by at least one hardware processor, a test speed 104 that corresponds to a maximum specified data transfer rate for a data transmission link 106 that is to be tested.

At block 904, the method may include determining, by the at least one hardware processor, a maximum specified processing speed 128 of at least one test processor 130 of a test instrument 132.

At block 906, the method may include determining, by the at least one hardware processor, whether the maximum specified processing speed 128 of the at least one test processor 130 of the test instrument 132 is less than the test speed 104.

Based on a determination that the maximum specified processing speed 128 of the at least one test processor 130 of the test instrument 132 is less than the test speed, at block 908, the method may include dividing, by the at least one hardware processor, the test speed 104 into a plurality of test ranges 116 corresponding to the at least one test processor 130.

At block 910, the method may include performing, by the at least one hardware processor, for the at least one test processor 130, a test 120 corresponding to each test range of the plurality of test ranges 116.

At block 912, the method may include obtaining, by the at least one hardware processor, an intermediate test result 122 for each test range of the plurality of test ranges 116.

At block 914, the method may include generating, by the at least one hardware processor, based on aggregation of each intermediate test result 122 for each test range of the plurality of test ranges 116, an aggregated test result 126 that represents an actual speed associated with the data transmission link 106.

Referring to FIGS. 1-7 and 10, and particularly FIG. 10, for the block diagram 1000, the non-transitory computer readable medium 1002 may include instructions 1006 to ascertain a test speed 104 that corresponds to a maximum specified data transfer rate for a data transmission link 106 that is to be tested.

The processor 1004 may fetch, decode, and execute the instructions 1008 to determine a maximum specified processing speed 128 of at least one test processor 130 of a test instrument 132.

The processor 1004 may fetch, decode, and execute the instructions 1010 to determine whether the maximum specified processing speed 128 of the at least one test processor 130 of the test instrument 132 is less than the test speed 104.

Based on a determination that the maximum specified processing speed 128 of the at least one test processor 130 of the test instrument 132 is less than the test speed 104, the processor 1004 may fetch, decode, and execute the instructions 1012 to divide the test speed 104 into a plurality of test ranges 116 corresponding to the at least one test processor 130.

The processor 1004 may fetch, decode, and execute the instructions 1014 to perform, for the at least one test processor 130, a test 120 corresponding to each test range of the plurality of test ranges 116.

The processor 1004 may fetch, decode, and execute the instructions 1016 to obtain an intermediate test result 122 for each test range of the plurality of test ranges 116.

The processor 1004 may fetch, decode, and execute the instructions 1018 to generate, based on aggregation of each intermediate test result 122 for each test range of the plurality of test ranges 116, an aggregated test result 126 that represents an actual speed associated with the data transmission link 106.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
 a test speed analyzer, executed by at least one hardware processor, to
  ascertain a test speed that corresponds to a maximum specified data transfer rate for a data transmission link that is to be tested;
 a test range generator, executed by the at least one hardware processor, to
  determine a maximum specified port speed of at least one test port of a device connected to the data transmission link that is to be tested,
  determine whether the maximum specified port speed is less than the test speed, and
  based on a determination that the maximum specified port speed is less than the test speed, divide the test speed into a plurality of test ranges, wherein a total value of the plurality of test ranges is at least equal to the test speed;
 a test performer, executed by the at least one hardware processor, to
  perform a test corresponding to each test range of the plurality of test ranges, and
  obtain an intermediate test result for each test range of the plurality of test ranges; and
 a test result generator, executed by the at least one hardware processor, to
  generate, based on aggregation of each intermediate test result for each test range of the plurality of test ranges, an aggregated test result that represents an actual speed associated with the data transmission link.

2. The apparatus according to claim 1, wherein the test speed analyzer is executed by the at least one hardware processor to ascertain the test speed that corresponds to the maximum specified data transfer rate for an Internet connection.

3. The apparatus according to claim 1, wherein the test range generator is executed by the at least one hardware processor to divide the test speed into the plurality of test ranges by:
 dividing the test speed into the plurality of test ranges that include equal test ranges.

4. The apparatus according to claim 1, wherein the test range generator is executed by the at least one hardware processor to divide the test speed into the plurality of test ranges by:
 dividing the test speed into the plurality of test ranges that include unequal test ranges.

5. The apparatus according to claim 1, wherein the test range generator is executed by the at least one hardware processor to divide the test speed into the plurality of test ranges by:
 dividing the test speed into the plurality of test ranges that include random test ranges.

6. The apparatus according to claim 1, wherein the total value of the plurality of test ranges is exactly equal to the test speed.

7. The apparatus according to claim 1, wherein the total value of the plurality of test ranges is greater than the test speed.

8. The apparatus according to claim 1, wherein the test performer is executed by the at least one hardware processor to perform the test corresponding to each test range of the plurality of test ranges by:
 initiating the test corresponding to each test range of the plurality of test ranges at a same time; and
 performing the test corresponding to each test range of the plurality of test ranges for a same time duration.

9. A method comprising:
 ascertaining, by at least one hardware processor, a test speed that corresponds to a maximum specified data transfer rate for a data transmission link that is to be tested;
 determining, by the at least one hardware processor, a maximum specified processing speed of at least one test processor of a test instrument;
 determining, by the at least one hardware processor, whether the maximum specified processing speed of the at least one test processor of the test instrument is less than the test speed;
 based on a determination that the maximum specified processing speed of the at least one test processor of the test instrument is less than the test speed, dividing, by the at least one hardware processor, the test speed into a plurality of test ranges corresponding to the at least one test processor, wherein a total value of the plurality of test ranges is at least equal to the test speed;
 performing, by the at least one hardware processor, for the at least one test processor, a test corresponding to each test range of the plurality of test ranges;
 obtaining, by the at least one hardware processor, an intermediate test result for each test range of the plurality of test ranges; and
 generating, by the at least one hardware processor, based on aggregation of each intermediate test result for each test range of the plurality of test ranges, an aggregated test result that represents an actual speed associated with the data transmission link.

10. The method according to claim 9, further comprising:
 determining, by the at least one hardware processor, a maximum specified port speed of at least one test port of a device connected to the data transmission link;
 determining, by the at least one hardware processor, whether the maximum specified port speed is less than the test speed;
 based on a determination that the maximum specified port speed is less than the test speed, dividing, by the at least one hardware processor, the test speed into a plurality of further test ranges, wherein a total further value of the plurality of further test ranges is at least equal to the test speed;
 performing, by the at least one hardware processor, a further test corresponding to each further test range of the plurality of further test ranges;
 obtaining, by the at least one hardware processor, an intermediate further test result for each further test range of the plurality of further test ranges;
 generating, by the at least one hardware processor, based on aggregation of each intermediate further test result for each further test range of the plurality of further test ranges, an aggregated further test result that represents an actual further speed associated with the data transmission link.

11. The method according to claim 10, further comprising:
   determining, by the at least one hardware processor, whether the actual further speed is less than the actual speed; and
   based on a determination that the actual further speed is less than the actual speed, generating an indication that the device is operating incorrectly.

12. The method according to claim 10, further comprising:
   determining, by the at least one hardware processor, whether the actual further speed is greater than or equal to the actual speed; and
   based on a determination that the actual further speed is greater than or equal to the actual speed, generating an indication that the device is operating correctly.

13. The method according to claim 9, wherein dividing, by the at least one hardware processor, the test speed into the plurality of test ranges further comprises:
   dividing, by the at least one hardware processor, the test speed into the plurality of test ranges that include equal test ranges;
   dividing, by the at least one hardware processor, the test speed into the plurality of test ranges that include unequal test ranges; or
   dividing, by the at least one hardware processor, the test speed into the plurality of test ranges that include random test ranges.

14. The method according to claim 9, wherein the total value of the plurality of test ranges is:
   exactly equal to the test speed; or
   greater than the test speed.

15. The method according to claim 9, wherein performing, by the at least one hardware processor, for the at least one test processor, the test corresponding to each test range of the plurality of test ranges further comprises:
   initiating, by the at least one hardware processor, the test corresponding to each test range of the plurality of test ranges at a same time; and
   performing, by the at least one hardware processor, the test corresponding to each test range of the plurality of test ranges for a same time duration.

* * * * *